United States Patent
Witzmann et al.

(10) Patent No.: US 12,181,270 B2
(45) Date of Patent: Dec. 31, 2024

(54) INSPECTION DEVICE FOR CYLINDRICAL BODIES

(71) Applicant: SCHOTT AG, Mainz (DE)

(72) Inventors: André Witzmann, Waldershof (DE); Armin Eisner, Leonberg (DE); Robert Witkowski, Weiden (DE)

(73) Assignee: SCHOTT AG, Mainz (DE)

( * ) Notice: Subject to any disclaimer, the term of this patent is extended or adjusted under 35 U.S.C. 154(b) by 324 days.

(21) Appl. No.: 17/145,040

(22) Filed: Jan. 8, 2021

(65) Prior Publication Data

US 2021/0207953 A1 Jul. 8, 2021

(30) Foreign Application Priority Data

Jan. 8, 2020 (EP) .................................... 20150706

(51) Int. Cl.
*G01B 11/24* (2006.01)

(52) U.S. Cl.
CPC .................................. *G01B 11/24* (2013.01)

(58) Field of Classification Search
CPC ..... G01B 11/24; G01B 11/00; G01B 11/2408; G01B 11/27; G01N 21/952; G01N 21/01; G01N 21/892
USPC ................................................ 356/601–640
See application file for complete search history.

(56) References Cited

U.S. PATENT DOCUMENTS

| | | | | |
|---|---|---|---|---|
| 4,226,539 A | * | 10/1980 | Nakagawa | G06G 7/1865 356/73 |
| 4,483,615 A | * | 11/1984 | Bieringer | G01N 21/958 250/559.46 |
| 5,136,157 A | * | 8/1992 | Apter | G01N 21/90 250/223 B |
| 5,652,432 A | * | 7/1997 | Yaginuma | G01N 21/952 209/579 |
| 6,199,679 B1 | | 3/2001 | Heuft | |
| 10,113,977 B2 | | 10/2018 | Humphries | |
| 2006/0192979 A1 | | 8/2006 | Lammert | |
| 2006/0196065 A1 | | 9/2006 | Bankestrom | |
| 2011/0025840 A1 | | 2/2011 | Fiegler | |
| 2015/0197443 A1 | | 7/2015 | Voelkl | |
| 2021/0207953 A1 | * | 7/2021 | Witzmann | G01N 21/952 |

FOREIGN PATENT DOCUMENTS

| | | |
|---|---|---|
| DE | 19916703 | 10/2000 |
| EP | 2280271 | 2/2011 |
| GB | 2567599 | 4/2019 |
| JP | S61292011 | 12/1986 |

(Continued)

*Primary Examiner* — Tri T Ton
(74) *Attorney, Agent, or Firm* — Ruggiero McAllister & McMahon LLC

(57) ABSTRACT

An inspection device for a cylindrical body, a bundle of cylindrical bodies having improved straightness, and methods of inspecting are provided. The inspection device includes a transport device, a rotation device, and a measuring device. The transport device moves the cylindrical body relative to the measuring device. The rotation device and the transport device rotate the cylindrical body while the cylindrical body is moving relative to the measuring device. The measuring device measures the cylindrical body while the cylindrical body is moving relative to the measuring device and while the cylindrical body is rotating.

22 Claims, 5 Drawing Sheets

(56) References Cited

FOREIGN PATENT DOCUMENTS

| | | |
|---|---|---|
| JP | H0772087 | 3/1995 |
| JP | H07218442 | 8/1995 |
| JP | H1145555 | 2/1999 |
| JP | 2002323419 | 11/2002 |
| JP | 2006242950 | 9/2006 |
| JP | 2007047097 | 2/2007 |
| JP | 2009186193 | 8/2009 |
| JP | 2015535794 | 12/2015 |

* cited by examiner

INSPECTION DEVICE FOR CYLINDRICAL BODIES

CROSS REFERENCE TO RELATED APPLICATIONS

This application claims benefit under 35 USC § 119 of European Application 20150706.8 filed Jan. 8, 2020, the entire contents of which are incorporated herein by reference.

BACKGROUND

1. Field of the Invention

The present invention refers to a specific inspection device for the quality assurance of cylindrical bodies and a specific bundle of cylindrical bodies having improved straightness.

2. Description of Related Art

The demand of high quality cylindrical bodies rises more and more. This is due to the fact that cylindrical bodies having an insufficient quality can cause high rejection rates and malfunction of machines. For example, the machine can be contaminated with particles resulting from a damaged or broken cylindrical body, which exceeds the dimensional tolerance. Since the economic competition in the field of pharmaceutical products, such as vials, cartridges, syringes or ampoules, increases, it is important to produce efficiently. This in turn is only possible if the cylindrical bodies, which may be an intermediate product of these pharmaceutical products, possess a high quality. Thereby, especially the curvature of the cylindrical body is an important quality measure. If the cylindrical body exhibits a strong curvature, the cylindrical body, for example a glass tube, can be damaged or break when it is further processed to a pharmaceutical product, such as a vial, cartridge, syringe or ampoule.

To obtain cylindrical bodies having a high quality, a raft of measures are necessary. For example, it is possible to improve the manufacturing processes, e.g. the Danner process or the Vello process, of the cylindrical bodies. However, these improvements have certain limits, and often lead to a point where the costs exceed the resultant benefit. Furthermore, there is a certain quality level, which might not be reliably achieved by all cylindrical bodies. In general, it is possible to pack the produced cylindrical bodies to a bundle without any inspection. Even if the overall average quality is high, this has the drawback that if one of the cylindrical bodies has a low quality, this becomes apparent solely at the site of the processor and can lead to malfunction of machines and thus, lead to further costs.

Another approach to improve the overall quality of the cylindrical bodies is to produce cylindrical bodies having a certain average quality and improve the overall quality by sorting out the cylindrical bodies having a quality below a specific value. Thereby, to obtain a good evaluation of the cylindrical bodies, it is important to evaluate the entire circumference of the cylindrical body. To handle the evaluation in a production line, a fast, efficient and reliable evaluation is needed. Thereby, a fast and efficient and reliable evaluation of the entire circumference is only possible, if the cylindrical body is rotated around it's own axis. This in turn is only possible, if a device continuously either rotates the cylindrical body while the measurement is running or a device repeatedly rotates the cylindrical body by a specific angle whereby at each angle a measurement takes place. If a cylindrical body is repeatedly rotated, the cylindrical bodies must usually be taken out of a transport device, inserted in an inspection device, inspected and then inserted again in the transport device. This procedure is very time consuming.

SUMMARY

Thus, an object of the present invention is to provide an inspection device for inspecting the entire circumference, especially the curvature, of a cylindrical body and which overcomes the above-described drawbacks. It is a further object of the present invention to provide an inspection device for a cylindrical body, which allows for an inspection without taking the cylindrical body out of the transport device. It is a further object of the present invention to provide an inspection device for a cylindrical body, which allows for a faster, more efficient and highly reliable measurement of the cylindrical bodies.

It is a further object of the invention to provide a bundle of cylindrical bodies, which allow for an improved, preferably flawless, subsequent processing.

The inventors surprisingly found that this object can be solved by an inspection device for a cylindrical body, comprising i) a transport device, ii) a rotation device, and iii) a measuring device; wherein the transport device is configured to move a cylindrical body relative to the measuring device; wherein the rotation device and the transport device are configured to rotate the cylindrical body while the cylindrical body is moving relative to the measuring device; and wherein the measuring device is configured to measure the cylindrical body while the cylindrical body is moving relative to the measuring device and while the cylindrical body is rotating.

Thus, the present invention refers to an inspection device for a cylindrical body, comprising i) a transport device, ii) a rotation device, and iii) a measuring device; wherein the transport device is configured to move a cylindrical body relative to the measuring device; wherein the rotation device and the transport device are configured to rotate the cylindrical body while the cylindrical body is moving relative to the measuring device; and wherein the measuring device is configured to measure the cylindrical body while the cylindrical body is moving relative to the measuring device and while the cylindrical body is rotating. In addition, herein disclosed is a specific bundle of cylindrical bodies having improved straightness, which can be obtained by using the specific inspection device.

DETAILED DESCRIPTION

Figure 1:
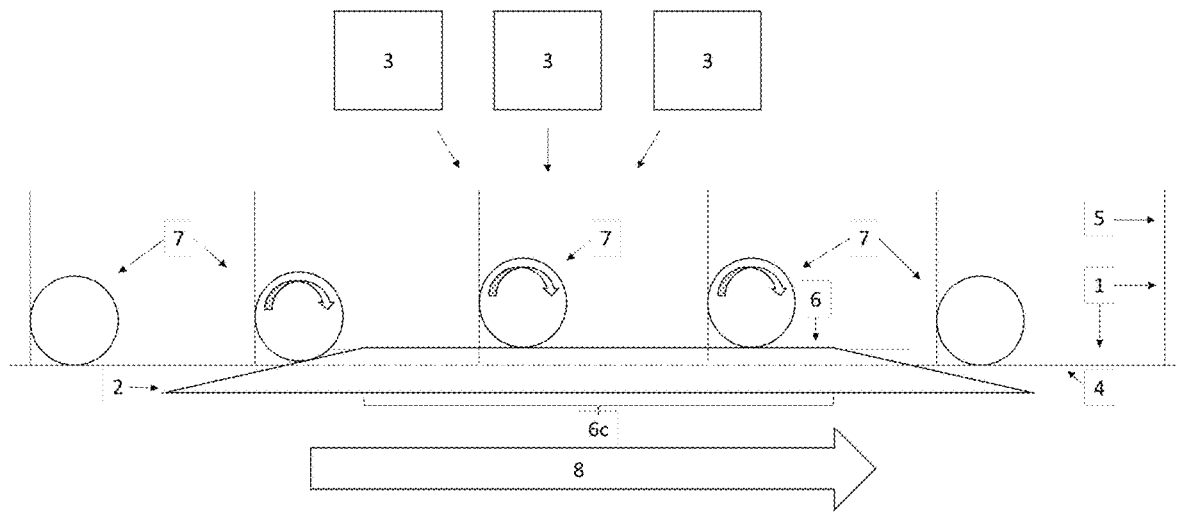
FIGS. 1 and 2 show side views of the inspection device according to the invention.

Herein, cylindrical bodies are bodies having at least one hollow or filled cylindrical portion, which is long enough and has an appropriate outer diameter so that it can be measured in the inspection device. The cylindrical portion defines the rotation axis. Preferably, the cylindrical body consists of a polymer or glass, more preferably cyclic olefin copolymer (COC), cyclic olefin copolymer (COP), aluminosilicate glass or borosilicate glass. Preferably, a cylindrical body is selected from a group consisting of tube, which may be sealed on one side or on both sides, pipe, vial, ampule, syringe and cartridge and is preferably a tube, which may be sealed on one side or on both sides, or a vial, and more preferably a tube, which may be sealed on one side or on both sides and more preferably a tube, which is sealed on both sides.

The length and outer diameter of the cylindrical portion is not particularly limited. However, if the length of the cylindrical portion is to short, the ratio of the contact plane of the cylindrical portion and the inspection device and the plane which has no contact with the inspection device during the inspection increases. If the length of the cylindrical portion is too long, handling of the cylindrical body hindered due to for example bending and thus, the inspection is less accurate. Therefore, a preferred length of the cylindrical portion of the cylindrical body is 1 cm or more to 1000 cm or less, preferably 20 cm or more to 400 cm or less, more preferably 60 cm or more to 300 cm or less, more preferably 100 cm or more to 200 cm or less, most preferably 120 cm or more to 180 cm or less and/or the outer diameter of the cylindrical portion of the cylindrical body is 2 mm or more and 100 mm or less, more preferably 4 mm or more and 50 mm or less, more preferably 6 mm or more and 35 mm or less, more preferably 8 mm or more and 25 mm or less, most preferably 10 mm or more and 20 mm or less. Preferably, the inspection device comprises a cylindrical body.

Herein, any term in the singular shall be understood to also include the plural and any terms in the plural shall also be understood to include the singular. Particularly, herein all restrictions and preferred embodiments of a cylindrical body also apply for a plurality of, for example 5 or more, cylindrical bodies. Further, all restrictions and preferred embodiments of the inspection device also apply for the bundle and vice versa unless specified otherwise.

Herein, a plane is the plane of a device, which is supposed to be in contact with the cylindrical body. The plane of a device itself may have any shape, for example, a cylindrical or cuboid shape, which may be round or even. Independent of the shape of the plane, important for determining parameters herein, e.g. the calculation of the angles or the point of contact, is the plane of a device, which is supposed to be in contact with the cylindrical body, when a cylindrical body is in the inspection device. Herein "even" means that a plane has essentially no curvature in the portion where the measurement takes place, preferably has no curvature at all.

Herein, a bundle is a trading, loading or packaging unit for distribution of cylindrical bodies. For example, products usually, but not necessarily, of the same kind are combined as bundles when ordered together in retail or bundled in logistics. According to the invention, cylindrical bodies in the bundle can be separated by a spacer, for example a plastic or paper sheet, so that they are not in contact with each other during transport. Usually, but not necessarily, the bundle is at least partly covered by a plastic foil. Preferably, one bundle contains 5 to 5000, preferably 10 to 1000, more preferably 25 to 500, more preferably 50 to 300, most preferably 75 to 250 cylindrical bodies. An example of a bundle is the DENSOPACK® from SCHOTT AG. Due to economic reasons, preferably the bundle contains 25 to 500, more preferably 50 to 300, most preferably 75 to 250 cylindrical bodies, which are at least partly covered by a plastic foil and wherein the cylindrical bodies are in direct contact to each other within the bundle. Preferably, the length of the cylindrical portion of the cylindrical bodies in the bundle is 1000 mm or more.

Herein, a relative movement is a movement, wherein the distance or angle, preferably the distance, of a specific object, e.g. the measuring device, to another specific object, e.g. the cylindrical body, is changing. A sole rotation of a cylindrical body is not a relative movement, since neither the distance nor the angle to another specific object changes.

Herein "while the cylindrical body is moving" or "while the cylindrical body is rotating" means that the cylindrical body moves or rotates at least within that period.

The inspection device for a cylindrical body comprises a transport device, a rotation device, and a measuring device. Minor modifications may be made to the inspection device without departing from the scope of the disclosure.

The transport device is configured to move a cylindrical body relative to the measuring device. The shape of the transport device is not particularly limited. In general, the transport device comprises a transport plane wherein the transport plane is configured to support the cylindrical body when the cylindrical body is not in contact with the rotation device and a feed plane wherein the feed plane is configured to push the cylindrical body forward. In particular, the feed plane is configured to push the cylindrical body forward when the cylindrical body is in contact with the rotation device. Preferably, the feed plane is statically mounted on the transport plane, preferably the feed plane are sticks which are statically mounted on the transport plane, more preferably the feed plane are sticks which are statically mounted on the transport plane and extend perpendicular to the transport plane.

The material of the transport plane and the feed plane is not particularly limited. Preferably the material is adapted regarding its frictional properties to realize an optimal rotation of the cylindrical body and minimize abrasion of the material onto the cylindrical body. If the transport plane consists of a polymer, preferably an elastomer, most preferably a silicone rubber the abrasion during transport of the cylindrical glass body can be minimized. In addition, if the material of the feed plane consist of polymer, graphite or wood, preferably graphite, friction between the cylindrical body and the transport device can be minimized and defects in e. g. cylindrical body can be reduced.

The inspection device can comprise one or more, e.g. 2, 3 or 4, transport devices. Preferably, the inspection device comprises two transport devices wherein the transport devices are parallel or change their distance within the inspection device, more preferably, the inspection device comprises two transport devices wherein the transport devices are parallel.

In general, the speed of the transport device is not limited. However, if the speed of the transport device is 1 m/s or less, preferably 0.001 to 1 m/s, preferably 0.001 to 0.5 m/s, more preferably 0.005 to 0.25 m/s, most preferably about 0.01 to 0.2 m/s, the inspection of the cylindrical body is fast but also very accurate.

In general, the rotation device comprises a rotation plane. The shape of the rotation plane is not particularly limited. It may be cylindrical or cuboid.

The material of the rotation plane is not particularly limited. However, if the rotation plane consists of a polymer, preferably an elastomer, most preferably a silicone rubber the abrasion during transport of the cylindrical body can be minimized and the load of particles on the cylindrical body can be reduced.

In an embodiment, the rotation device comprises a static rotation plane, i.e. the rotation plane does not move relative to the measuring device while the cylindrical body is inspected. This has the advantage that construction is simplified and thus saves maintenance costs and time.

In another embodiment, the rotation device comprises a moving rotation plane, wherein the moving rotation plane moves relative to the measuring device and the transport device. More preferably, the moving rotation plane is configured to move in a reverse direction with regard to the transport plane, more preferably, the moving rotation plane is configured to move in a reverse direction with regard to the transport plane with a speed of 0.001 km/h to 10 km/h, preferably 0.001 m/s to 0.5 m/s, more preferably 0.002 m/s to 0.3 m/s, more preferably 0.005 m/s to 0.25 m/s, most preferably 0.01 m/s to 0.2 m/s. Thereby, a faster inspection of the body is possible. A redundant inspection of the entire circumference can be realized through a high rotation speed during the inspection relative to the transport speed of the transport device. This high rotation speed can be achieved by a moving rotation plane, wherein the moving rotation plane is configured to move in a reverse direction with regard to the transport plane.

In one embodiment, the rotation device comprises a rotation plane, wherein the rotation plane is an even rotation plane. In another embodiment, the rotation plane is an uneven rotation plane. Preferably, the rotation plane is an even rotation plane.

Preferably, the width of the rotation plane is 0.1 mm to 200 mm, preferably 1 mm to 5 mm. If the width is too small, the friction which is necessary to rotate the cylindrical body is not sufficient. In contrast thereto, if the width is too broad, the contact area of the rotation plane increases and defects at the cylindrical body may increase.

Preferably, the length of the rotation plane is 1 to 300 cm, preferably 5 to 200 cm, more preferably 10 to 50 cm. If the rotation plane is too short, a homogeneous measurement is not possible. In contrast thereto, if the rotation plane is too long, the contact area of the rotation plane increases and defects at the cylindrical body may increase.

The inspection device can comprise one or more, e.g. 2, 3 or 4, rotation devices. In one embodiment, the rotation device is arranged diagonal in the inspection device. In another embodiment, the inspection device comprises two rotation devices wherein the rotation devices are parallel or change their distance within the inspection device, more preferably, the inspection device comprises two rotation devices wherein the rotation devices are parallel.

The rotation device and the transport device are configured to rotate the cylindrical body while the cylindrical body is moving relative to the measuring device. Preferably, during rotation of the cylindrical body, the cylindrical body is not in contact with the transport plane of the transport device. Thus, in general, the transport device comprises a transport plane and a feed plane and the rotation device comprises a rotation plane and the rotation is stimulated by the fact that during rotation, the cylindrical body is in contact with the feed plane of the transport device and the rotation plane of the rotation device but not in contact with the transport plane of the transport device.

Preferably, at least one part of the rotation plane is parallel to the transport plane. Preferably, the feed plane and the rotation plane are perpendicular to each other. Preferably, the transport device and the rotation device is configured to lift the cylindrical body while the cylindrical body is moving relative to the measuring device and while the cylindrical body is rotating. Thus, preferably, the transport device and the rotation device are inclined rotation planes and wherein the inclined rotation planes are configured to lift the cylindrical body while the cylindrical body is moving relative to the measuring device and while the cylindrical body is rotating. By such a configuration, the friction affected by the gravity is reduced and defects can be prevented.

More preferably, at least in one area of the rotation plane is parallel to the transport plane and the feed plane and the rotation plane are perpendicular to each other and in another area the rotation plane is an inclined rotation plane and wherein the inclined rotation plane is configured to lift the cylindrical body while the cylindrical body is moving relative to the measuring device and while the cylindrical body is rotating.

Preferably, the transport device and the rotation device are not in contact with each other. Thus, both devices can be installed separately and maintenance work of the inspection device is reduced. In addition, if the transport device and the rotation device are not directly connected with each other, it is possible to adjust the contact area of the cylindrical body and the transport device and the rotation device. Thus, defects can be prevented.

The inspection device can comprise one or more rotation devices and one or more transport devices. In a preferred embodiment, the inspection device comprises two or more rotation devices and two or more transport devices wherein the rotation devices and transport devices are parallel or change their distance within the inspection device, more preferably, the inspection device comprises two or more, preferably two, rotation devices and two or more, preferably two, transport devices wherein the rotation devices and transport devices are parallel.

The measuring device is configured to measure the cylindrical body while the cylindrical body is moving relative to the measuring device and while the cylindrical body is rotating.

In general, several parameters can be measured. The inspection device can comprise one or more measuring devices so that one or more parameters can be detected at the same time or one parameter can be determined at different positions of the cylindrical body while the cylindrical body is rotating and moving in a direction.

In general, the measuring device measures at least one portion of the cylindrical body. However, it is possible to measure one or more portions of the cylindrical body by one or more measuring devices as well as to measure the entire cylindrical body with one measuring device. Preferably, the measuring device measures one or more portions of the cylindrical body, more preferably the measuring device measures the entire cylindrical body.

Preferably, the angle between a normal of the feed plane and the centerline of the measuring device, e.g. a camera, and/or, preferably and, the angle of the rotation plane and the centerline of the measuring device are more than 45° to less than 135°, preferably 60° to 120°, more preferably 70° to 110°, more preferably 80° to 100°, more preferably 85° to 95°, most preferably 90°.

Preferably, the measuring device measures the curvature and the angle between the normal of the feed plane and the centerline of the measuring device and/or, preferably and, the angle of the rotation plane and the centerline of the measuring device are more than 45° to less than 135°, preferably 60° to 120°, more preferably 70° to 110°, more preferably 80° to 100°, more preferably 85° to 95°, most preferably 90°. The inventors surprisingly found out that if the angle is close to 90°, e.g. 70° to 110°, the curvature of a cylindrical body can be measured without being influenced by other variations of the cylindrical body, like the variation of the thickness or the ovality of the cylindrical body (see detailed explanation below). The specific angle can be achieved either by using more than one measuring devices or by using only one measuring device, if the distance between the measuring device and the cylindrical body is long enough, e.g. 20 to 200 cm, preferably 30 to 100 cm, most preferably 40 to 60 cm, so that the angle only changes slightly while the cylindrical body is moving relative to the measuring device and while the cylindrical body is rotating.

Preferably, the measurement device is an object and geometry inspection device, preferably comprising laser technology or a camera. More preferably, the measurement device is a camera. The centerline of a measurement device, e.g. a camera, herein is the normal extending from the middle of the measurement device, e.g. the camera lens.

The inspection device can optionally comprise a sorting device. The sorting device is configured to sort out cylindrical bodies having a quality below a specific value. Any value, measured by the measuring device, can be selected, e.g. the curvature of the cylindrical body.

The cylindrical bodies having a quality below a specific value can be sorted out by, for example a gripper, an air blast or a trap door, preferably a trap door.

With the above inspection device, it is possible to obtain a bundle of cylindrical bodies having an improved straightness, which can be used for highly demanding applications. Furthermore, cylindrical bodies having lower quality can separated and further used for less demanding applications. By using the above described inspection device, it is not particularly necessary to produce cylindrical bodies of extraordinary high quality as long as a subset of the cylindrical bodies exhibits a quality sufficient for a bundle of cylindrical bodies having a high quality. In addition, with the above-described device it is possible to guarantee a very high quality of all cylindrical bodies within the bundle, because all cylindrical bodies are measured. For some applications, even a few cylindrical bodies below a specific quality level are not sufficient. Additionally, by using the above-described inspection device, it is possible to obtain a customized bundle of cylindrical bodies having a specific quality. Especially the curvature of the cylindrical body can be reliably inspected with the above described inspection device in a manner, which is explained in detail in the examples and methods of measurements section below.

Consequently, by using the above described inspection device, a bundle comprising 5 or more cylindrical bodies can be obtained, wherein all cylindrical bodies in the bundle exhibit a curvature of 1 mm or less. Preferably, all cylindrical bodies in the bundle exhibit a curvature of 0.9 mm or less, more preferably 0.8 mm or less, more preferably 0.7 mm or less, more preferably 0.6 mm or less, more preferably 0.5 mm or less, more preferably 0.4 mm or less, more preferably 0.3 mm or less, more preferably 0.2 mm or less, more preferably 0.1 mm or less. The lower limit is not particularly limited. For economic reasons, preferably all cylindrical bodies in the bundle exhibit a curvature of 0.01 mm or more.

Preferably, all cylindrical bodies in the bundle exhibit a curvature of 1 mm or less, preferably 0.9 mm or less, more preferably 0.8 mm or less, more preferably 0.7 mm or less, more preferably 0.6 mm or less, more preferably 0.5 mm or less, more preferably 0.4 mm or less, more preferably 0.3 mm or less, more preferably 0.2 mm or less, more preferably 0.1 mm or less; and/or, more preferably and, all cylindrical bodies in the bundle exhibit a curvature of 0.01 mm or more; and/or, more preferably and, wherein the cylindrical bodies are tubes; and/or, more preferably and, wherein the cylindrical bodies consist of a polymer or glass, more preferably cyclic olefin copolymer (COC), cyclic olefin copolymer (COP), aluminosilicate glass or borosilicate glass; and/or, more preferably and, wherein the length of the cylindrical portion of the cylindrical bodies is 1 cm or more to 1000 cm or less, preferably 20 cm or more to 400 cm or less, more preferably 60 cm or more to 300 cm or less, more preferably 100 cm or more to 200 cm or less, most preferably 120 cm or more to 180 cm or less and/or the outer diameter of the cylindrical portion of the cylindrical bodies is 2 mm or more and 100 mm or less, more preferably 4 mm or more and 50 mm or less, more preferably 6 mm or more and 35 mm or less, more preferably 8 mm or more and 25 mm or less, most preferably 10 mm or more and 20 mm or less; and/or, more preferably and, one bundle contains 5 to 5000, preferably 10 to 1000, more preferably 25 to 500, more preferably 50 to 300, most preferably 75 to 250 cylindrical bodies.

Preferably, all cylindrical bodies are measured by an inspection device according to the invention. Details of the measurement of the curvature are described below.

Figure 2:
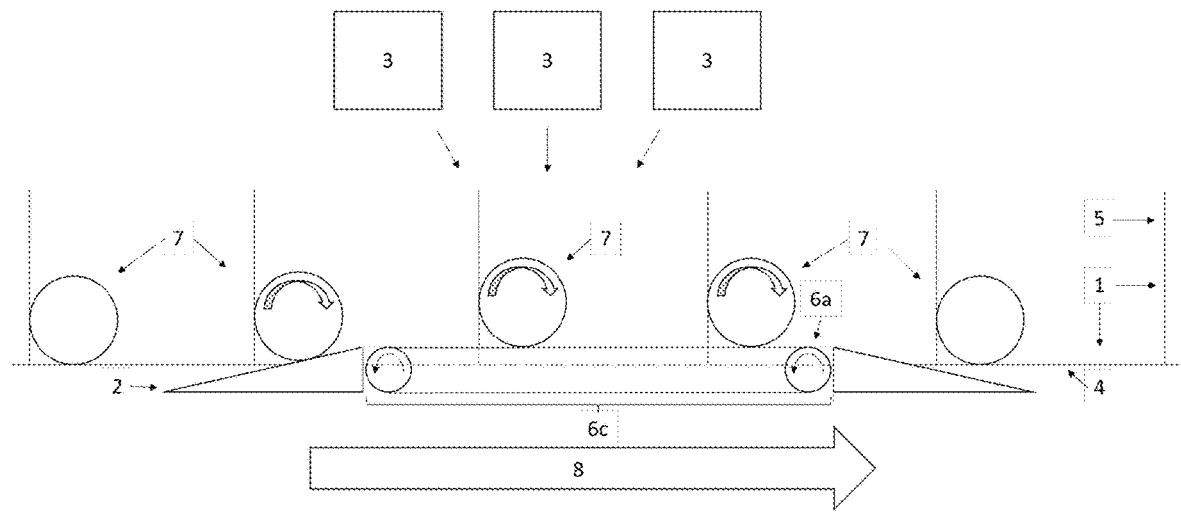
Figure 3:
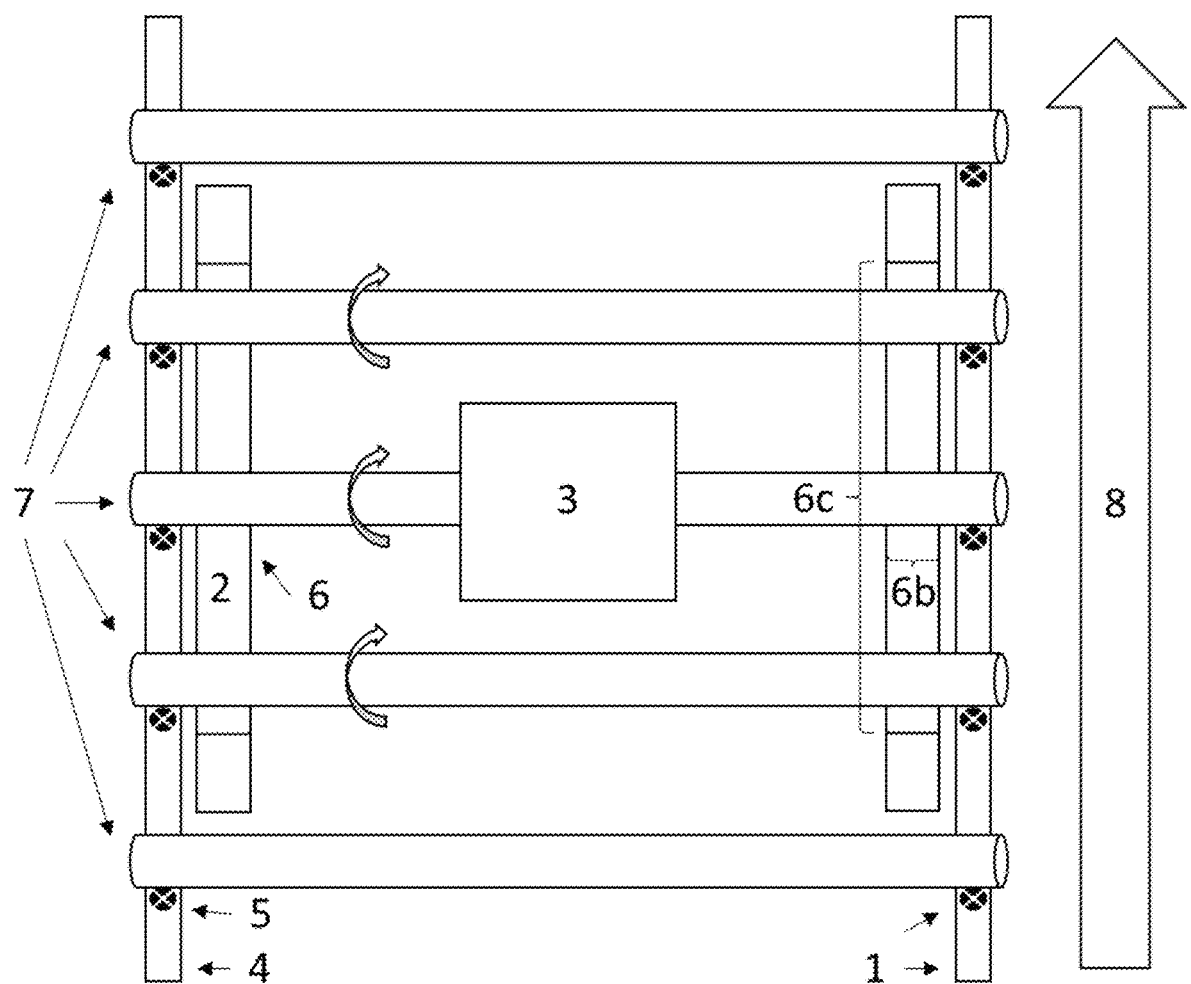
FIGS. 3 and 4 show top views of the inspection device.
Figure 4:
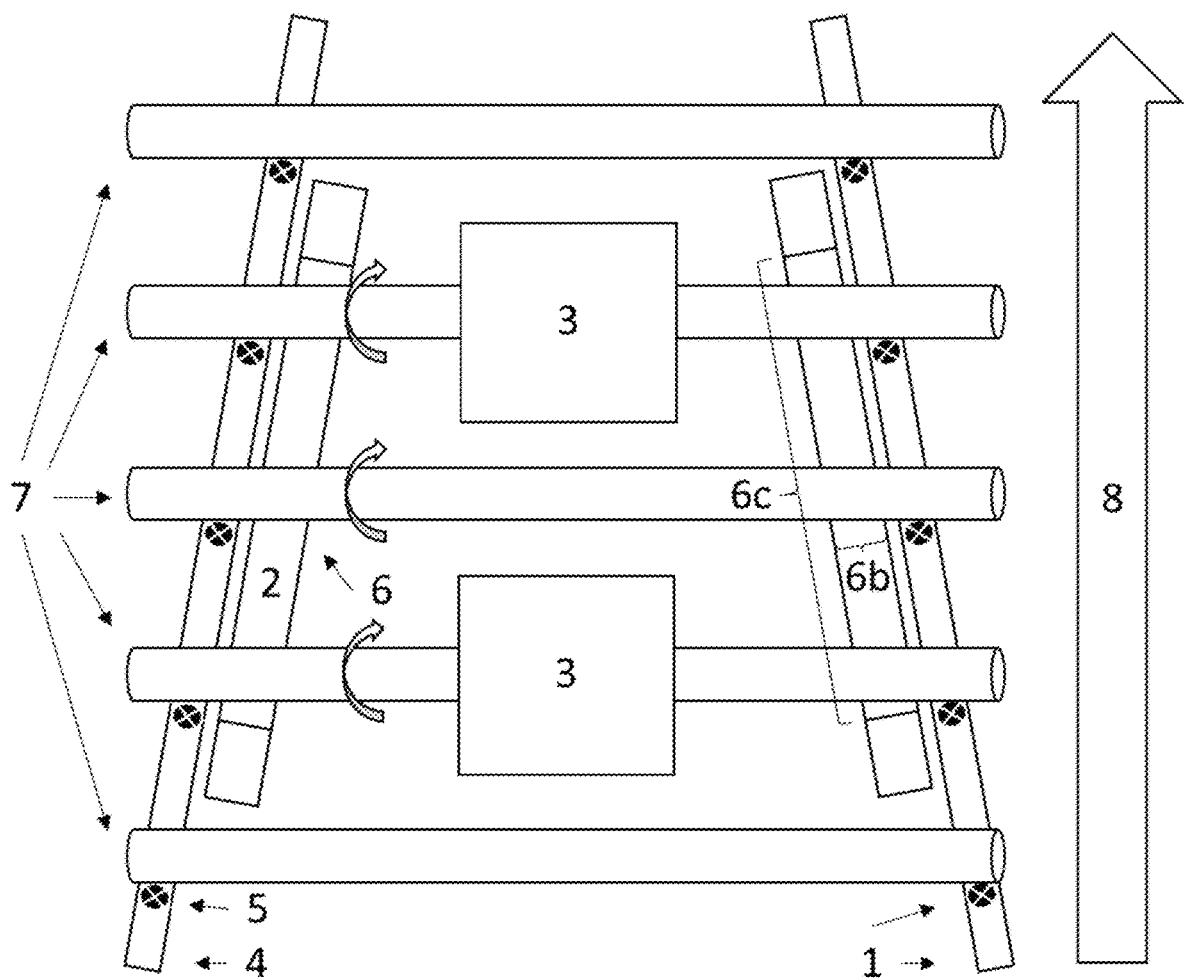
Figure 5:
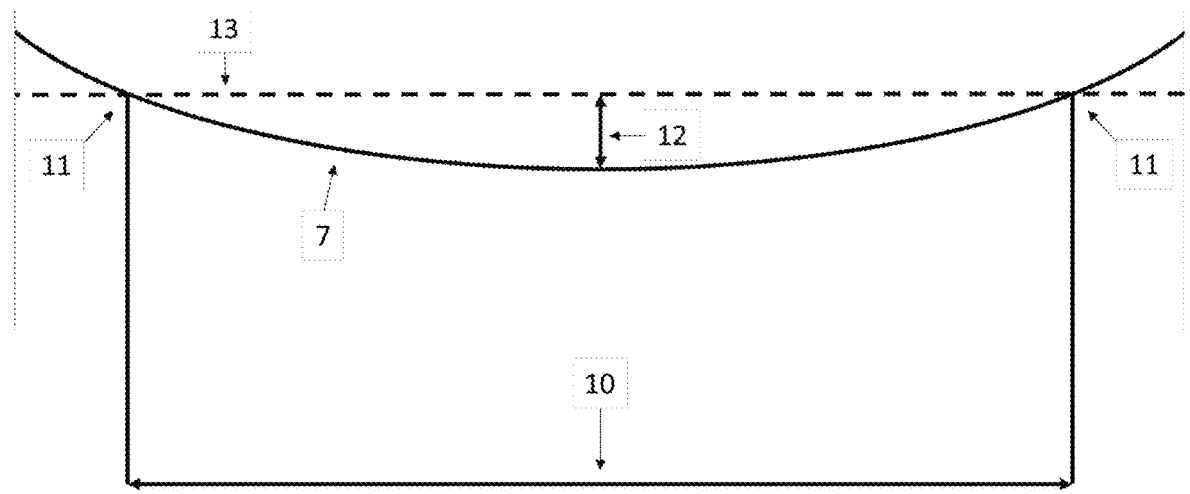
FIGS. 5 to 8 show how the curvature is measured.

In FIGS. 1 to 4, as examples, inspection devices according to the invention are depicted. FIGS. 1 and 2 show a side view and FIGS. 3 and 4 show a top view of the inspection device. FIGS. 5 to 8 show how the curvature is measured.

All examples depicted in FIGS. 1 to 4 have in common that the inspection device comprises a transport device 1, a rotation device 2, and a measuring device 3. The transport device 1 comprises transport planes 4 and feed planes 5. Normally, the inspection device contains two transport devices 1 comprising each a transport plane 4 on which one or more feed planes 5 are fixed. The rotation device 2 comprises two rotation planes 6/6a. Normally, the inspection device comprises two rotation devices 2. The rotation plane 6/6a can either be a static rotation plane 6 (FIG. 1) or comprise a moving rotation plane 6a, preferably moving in a reverse direction with regard to the transport device 1 (see FIG. 2).

The inspection device comprises one or more measuring devices 3, which can be positioned at any position in the inspection device. Thereby, the position of the measuring device 3 depends on the property that should be measured. If the inspection device comprises more than one measuring device 3, more than one property can be easily measured within one inspection device. Sometimes, it might be necessary to install more than one measuring device 3 of the same kind, to obtain an entire view on the cylindrical body 7. In one example, two rotation planes 6/6a and/or transport planes 4 are parallel (FIG. 3). In another example, the distance between two rotation planes 6/6a and/or transport planes 4 changes, i.e. diminishes (FIG. 4) or extends. This might be beneficial, if a measuring device 3 needs to measure through the cylindrical body 7. In this case more than one measuring device 3 of the same type can be installed at different positions to obtain an entire inspection of the whole cylindrical body 7 (FIG. 4). Another example (not shown), having the same effect, is an inspection device in which one rotation device 2 is arranged diagonal from a top view. The transport device 1 is configured to move a cylindrical body 7 relative to the measuring device 3. In FIGS. 1 to 4, the cylindrical body/bodies 7 move(s) in a specific direction 8. When the cylindrical body 7 arrives at the inspection device, the cylindrical body 7 is at least in contact with the transport plane 4, and usually in contact with the transport plane 4 and the feed plane 5. In the inspection device, the cylindrical body 7 gets in contact with the rotation plane 6/6a, while it moves further relative to the measuring device 3. Since the speed of the rotation plane 6/6a compared to the feed plane 5 is different, the cylindrical body 7 starts to rotate around its rotation axis. While the cylindrical body 7 is moving relative to the measuring device 3 and while the cylindrical body 7 is rotating, one or more measuring devices 3 measures one or more properties. By the rotation of the cylindrical body 7 and a specific position and focus of the measuring device 3, the entire circumference of the cylindrical body 7 can be measured.

The way of measurement of the curvature is described based on FIGS. 5 to 8. Based on FIG. 5, the definition of the curvature of the cylindrical body 7 will be explained. The cylindrical portion of the cylindrical body 7 is in contact with two defined contact points 11 having a distance of 1000 mm. The curvature herein is the maximum length of the deviation of the outer surface at any position of the cylindrical body 12 from an ideal line 13 defined by the two contact points 11 measured when the cylindrical body 7 is rotated 360 degrees around its rotation axis. If the cylindrical portion of the cylindrical body is longer than 1000 mm, the measurement is conducted in a way that the middle of the cylindrical portion of the cylindrical body is in the middle of the two contact points.

Figure 6:
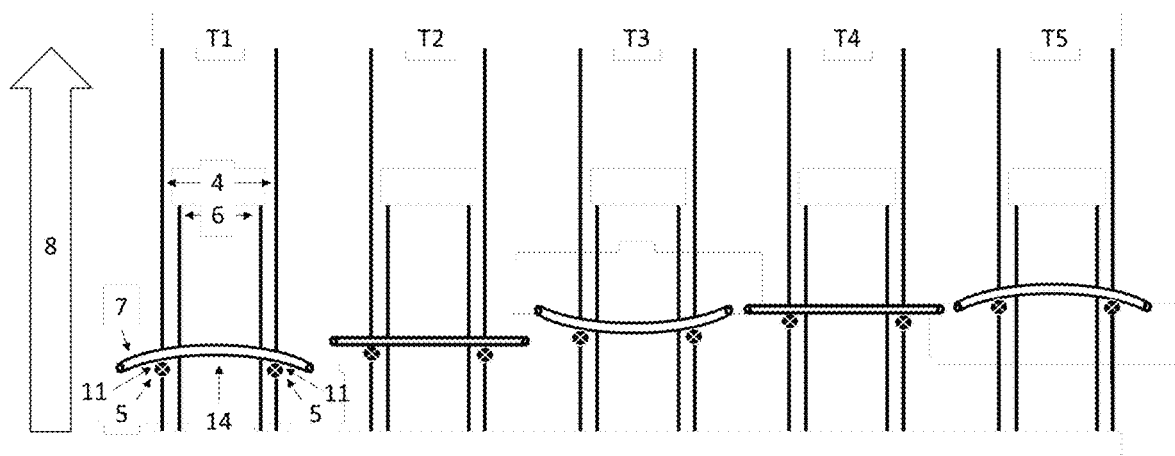
Figure 7:
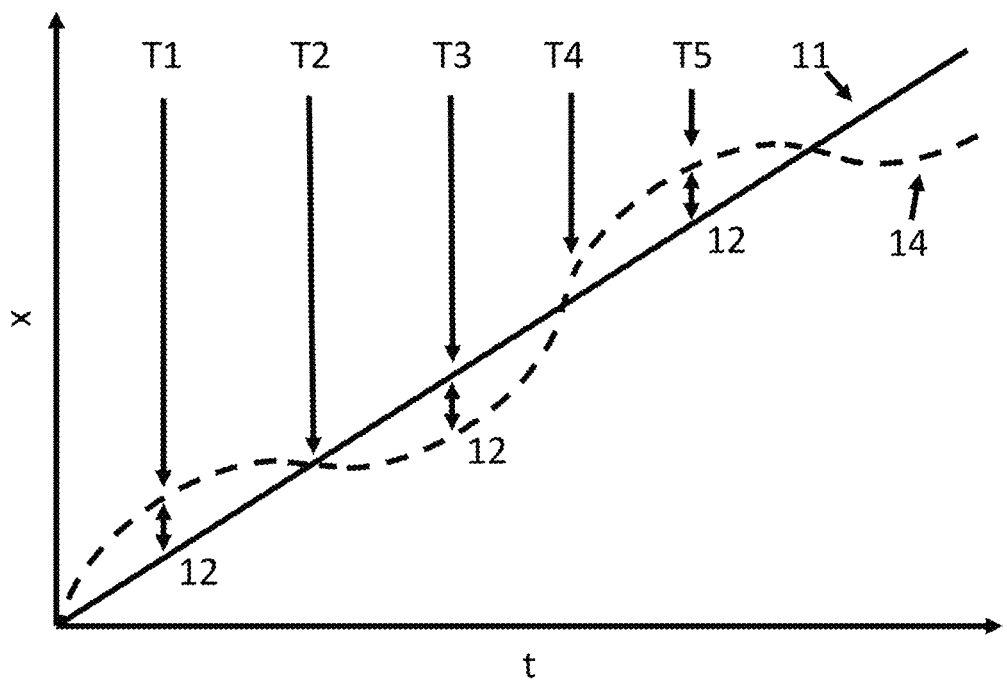

An exemplary measurement of a cylindrical body 7 having a curvature is depicted in FIGS. 6 and 7. As can be seen in FIG. 6, during the measurement, the cylindrical body 7 is in contact with the feed planes 5 defining the two contact points 11 and the rotation planes 6/6a so that the cylindrical body 7 is rotating while the feed planes 5 are moving in a direction 8. The measurement is conducted along the viewline. The measuring device 3 (not shown) measures the positions x of the contact points 11 and a position at the outer surface of the cylindrical body 7 between the contact points 11 over the time t. As can be seen in FIGS. 6 and 7, at a point T1, the position 14 at the outer surface of the cylindrical body 7 between the contact points 11 is in front of the positions of the contact points 11 having always the same value and thus the position 14 has a higher value x. The length between the two points 11 and 14 is the length of the deviation of the outer surface of the cylindrical body 12. In point T2, the curvature protrudes in the paper plane and the position at the outer surface of the cylindrical body 7 between the contact points 11 and the positions of the contact points 11 have the same value x. In point T3, bending protrudes in a direction opposite to the direction of movement 8 of the feed planes 5. Thus, the position at the outer surface of the cylindrical body 7 between the contact points 11 is behind the positions of the contact points 11 and thus the position 14 has a lower value x. Again, the length between the two contact points 11 and 14 is the length of the deviation of the outer surface of the cylindrical body 12. In point T4, the bending protrudes out of the paper plane and the position at the outer surface of the cylindrical body 7 between the contact points 11 and the positions of the contact points 11 have the same level. At position T5, the cylindrical body 7 rotated 360° and the measuring results are the same as for T1. The curvature is the longest distance evaluated by the above described method at any position of the cylindrical body between the two contact points 11. To obtain the curvature, i.e. the maximum length of the deviation of the outer surface at any position of the cylindrical body 12 from an ideal line 13, every point of the outer surface must be measured in the above-described way. All points are measured sequentially or simultaneously.

Figure 8:
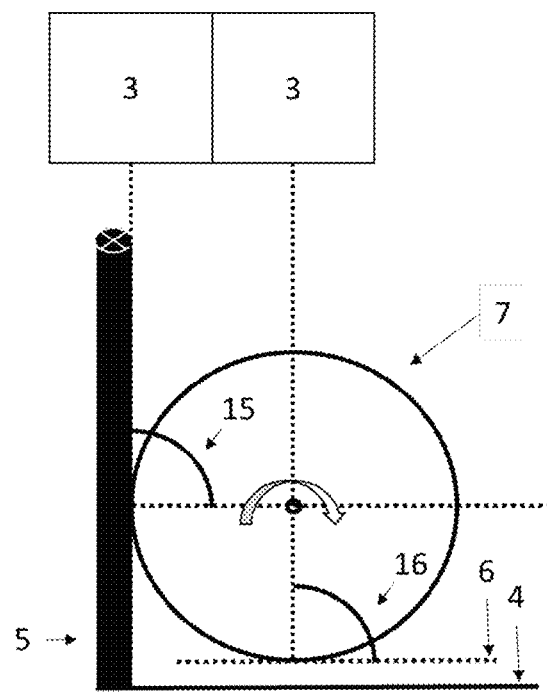

In FIG. 8, a schematic drawing of the angle between the normal of the feed plane 5 and measuring direction 15 is depicted. In addition, the angle of the rotation plane 6/6a and the measuring direction 16 is depicted. Both angles are 90°.

In summary, the curvature is measured as described in the following: contacting the cylindrical portion of the cylindrical body 7 with two defined contact points 11 having a distance of 1000 mm; measuring the maximum length, i.e. the curvature, of the deviation of the outer surface at any position of the cylindrical body 12 from an ideal line 13 defined by the two contact points 11 when the cylindrical body 7 is rotated 360 degrees around its rotation axis; wherein if the cylindrical portion of the cylindrical body is longer than 1000 mm, the measurement is conducted in a way that the middle of the cylindrical portion of the cylindrical body is in the middle of the two contact points.

PARTS LIST 1 transport device
2 rotation device
3 measuring device
4 transport plane
5 feed plane
6 rotation plane
6a moving rotation plane
6b width of the rotation plane
6c length of the rotation plane
7 cylindrical body
8 direction of movement
10 distance of the two contact points 10
11 contact point
12 length of the deviation of the outer surface of the cylindrical body 7, i.e. the curvature
13 ideal line
14 a position at the outer surface of the cylindrical body 7 between the contact points 11
15 angle between the normal of the feed plane 5 and the centerline of the measuring device
16 angle of the rotation plane 6/6a and the centerline of the measuring device

What is claimed is:

1. An inspection device for a cylindrical body, comprising:
   a transport device having a feed plane statically mounted on a transport plane;
   a rotation device;
   a measuring device,
   wherein the transport device is configured to move the cylindrical body relative to the measuring device,
   wherein the rotation device and the transport device are configured to rotate the cylindrical body while the cylindrical body is moving relative to the measuring device,
   wherein the measuring device is configured to measure the cylindrical body while the cylindrical body is moving relative to the measuring device and while the cylindrical body is rotating, and
   wherein the transport device is configured so that during rotation of the cylindrical body, the cylindrical body is not in contact with the transport plane of the transport device, and
   a first angle between a normal of the feed plane and a measuring direction of the measuring device that is more than 45° to less than 135°.

2. The inspection device of claim 1, wherein the first angle is more than 85° to less than 95°.

3. The inspection device of claim 1, wherein the rotation device comprises a rotation plane.

4. The inspection device of claim 3, wherein at least a part of the rotation plane is parallel to the transport plane and/or perpendicular to the feed plane.

5. The inspection device of claim 3, wherein the transport plane and the rotation plane are even and parallel to each other.

6. The inspection device of claim 3, further comprising a second angle of the rotation plane and the measuring direction of the measuring device that is more than 45° to less than 135°.

7. The inspection device of claim 1, wherein the rotation device comprises a moving rotation plane, wherein the moving rotation plane moves relative to the measuring device and the transport device.

8. The inspection device of claim 6, wherein the moving rotation plane moves in a reverse direction with regard to the transport device.

9. The inspection device of claim 1, wherein the rotation device comprises a rotation plane having a length from 1 cm to 1,000 cm.

10. A bundle comprising five or more of the cylindrical bodies measured by the inspection device of claim 1, wherein all of the five or more of the cylindrical bodies exhibit a curvature of 1 mm or less.

11. The bundle of claim 10, wherein the five or more cylindrical bodies are tubes made of a material selected from a group consisting of polymer, glass, cyclic olefin copolymer (COC), cyclic olefin copolymer (COP), aluminosilicate glass, and borosilicate glass.

12. The bundle of claim 11, wherein the tubes have a length from 1 cm to 1,000 cm and/or an outer diameter of from 2 mm to 100 mm.

13. A method of inspecting a cylindrical body having a rotational axis along its length, comprising:
moving the cylindrical body relative to a measuring device along a transport plane of a transport device while the cylindrical body is in contact with two feed planes that are statically mounted to the transport plane;
rotating the cylindrical body about the rotational axis while the cylindrical body is moving relative to the measuring device and while the cylindrical body is in contact with the two feed planes,
wherein the cylindrical body is not in contact with the transport plane of the transport device during rotation of the cylindrical body; and
measuring, using the measuring device, a curvature of the cylindrical body while the cylindrical body is moving relative to the measuring device and while the cylindrical body is in contact with the two feed planes while maintaining a first angle between a normal of the feed plane and a measuring direction of the measuring device to between 45° and 135°.

14. The method of claim 13, wherein the step of measuring is sufficient so that the curvature is not influenced by variations of the cylindrical body selected from a group consisting of a variation of a thickness of the cylindrical body, a variation of ovality of the cylindrical body, and combinations thereof.

15. The method of claim 13, further comprising maintaining second angle between the rotational axis and the measuring direction of the measuring device to between 70° and 110°.

16. The method of claim 15, wherein the first and/or second angles are close to 90°.

17. The method of claim 15, wherein the first and/or second angles are maintained by using more than one measuring device.

18. The method of claim 14, wherein the first and/or second angles are maintained by using a single measuring device spaced from the cylindrical body so that the first and/or second angle only changes slightly while the cylindrical body is moving relative to the measuring device and while the cylindrical body is rotating.

19. The method of claim 13, further comprising sorting out the cylindrical body if the curvature has a quality differing from a specific curvature value.

20. A bundle comprising a plurality of the cylindrical bodies, wherein each body of the plurality of cylindrical bodies is measured by the method of claim 18, wherein the specific curvature value comprises a curvature of 1 mm or less so that all of the plurality of the cylindrical bodies exhibit the curvature of 1 mm or less.

21. An inspection device for a cylindrical body, comprising:
a measuring device;
a rotation device having a rotation plane; and
a transport device having a transport plane and a feed plane, the feed plane being normal to and statically mounted on the transport plane, the transport plane being parallel to the rotation plane,
wherein the rotation device and the transport device are configured to rotate the cylindrical body on the rotation plane while the cylindrical body is moving in the transport plane relative to the measuring device,
wherein the transport device is configured so that during rotation of the cylindrical body, the cylindrical body is not in contact with the transport plane of the transport device,
wherein the measuring device is configured to measure the cylindrical body while the cylindrical body is moving in the transport plane relative to the measuring device and while the cylindrical body is rotating, and
wherein the measuring device is positioned to define a first angle between a normal of the feed plane and a measuring direction of the measuring device that is more than 45° to less than 135°.

22. The inspection device of claim 21, wherein the measuring device is positioned to define a second angle between the rotation plane and the measuring direction of the measuring device that is more than 45° to less than 135°.

* * * * *